United States Patent [19]

Monti

[11] Patent Number: 5,037,914

[45] Date of Patent: Aug. 6, 1991

[54] PROCESS FOR PREPARING TETRAFLUOROETHYLENE-ETHYLENE COPOLYMERS

[75] Inventor: Claudio Monti, Milan, Italy

[73] Assignee: Ausimont s.r.l., Milan, Italy

[21] Appl. No.: 437,678

[22] Filed: Nov. 17, 1989

[30] Foreign Application Priority Data

Nov. 17, 1988 [IT] Italy .............................. 22643 A/88

[51] Int. Cl.$^5$ ................................................ C08F 2/16
[52] U.S. Cl. ................................... 526/206; 526/212; 526/250
[58] Field of Search .................... 526/212, 250, 206

[56] References Cited

U.S. PATENT DOCUMENTS

| | | |
|---|---|---|
| 2,479,367 | 8/1949 | Joyce et al. |
| 2,490,712 | 12/1949 | Schulze et al. ..................... 526/212 |
| 3,313,863 | 4/1967 | Schnell et al. ..................... 526/212 |
| 3,462,401 | 8/1969 | Kometami et al. ................. 526/212 |
| 3,637,631 | 1/1972 | Sianesi et al. ..................... 526/212 |
| 3,658,742 | 4/1972 | Fish et al. ......................... 526/212 |
| 4,426,501 | 1/1984 | Khan . |
| 4,555,556 | 11/1085 | Beresniewicz ..................... 526/212 |

FOREIGN PATENT DOCUMENTS

| | | | |
|---|---|---|---|
| 3922586 | 10/1964 | Japan ................................. 526/212 |
| 929138 | 6/1963 | United Kingdom ................ 526/212 |
| 1142723 | 2/1969 | United Kingdom ................ 526/212 |

Primary Examiner—Joseph L. Schofer
Assistant Examiner—N. Sarofim
Attorney, Agent, or Firm—Stevens, Davis, Miller & Mosher

[57] ABSTRACT

The present invention relates to a process for preparing copolymers of tetrafluoroethylene with ethylene, and optionally with a third monomer, of vinylic character.

The process is characterized in that tetrafluoroethylene is caused to react with ethylene and with the optional third, vinylic, monomer in an aqueous emulsion with the aid of a polymerization initiator of peroxy type, at a temperature within the range between 30° and 95° C. and under a pressure within the range of from 1.5 to 4.0 MPa, in the presence of tert.-butyl alcohol and of 1,1,2,2-tetrachloro-1,2-difluoroethane.

13 Claims, No Drawings

PROCESS FOR PREPARING TETRAFLUOROETHYLENE-ETHYLENE COPOLYMERS

FIELD OF THE INVENTION

The present invention relates to a process for preparing tetrafluoroethylene-ethylene copolymers optionally containing a third monomer, of vinylic nature.

BACKGROUND OF THE INVENTION

Such copolymers are usually prepared in suspension in chlorofluorocarbon solvents, in an aqueous suspension or in an aqueous emulsion.

The polymerization in suspension in chlorofluorocarbon solvents does not permit fast reaction speeds to be achieved even if the process is to be carried out under low pressures and at low temperatures.

Regarding polymerization in aqueous suspension, considerably large amounts of tert.-butanol, which is the main constituent of the reaction medium, have to be used in the processes disclosed in U.S. Pat. Nos. 2,479,367 and 3,870,689. Furthermore, with these techniques, discharging the reaction products from the reactor is not easy, in that a slurry is obtained, which is difficult to be handled.

In U.S. Pat. No. 3,859,262, use is proposed of particular salts of manganese as polymerization initiators. These salts increase the reaction speed. However, although use of organic solvents is avoided, the disclosed process does not permit reaction speeds greater than 60 grams of tetrafluoroethylene/ethylene copolymer per liter per hour. Still in this patent, a technique of polymerization in aqueous emulsion is disclosed. This disclosure does not permit reaction speeds of 85 grams of copolymer per liter per hour to be exceeded. One should finally observe that use of chain transfer agents for regulating molecular weight of the obtained polymers causes a further decrease in reaction speed.

In U.S. Pat. No. 4,426,501, a process is taught for carrying out the synthesis of tetrafluoroethylene-ethylene copolymers in aqueous emulsion, which permits greater reaction speeds to be obtained. According to such a process, the reaction should be carried out at 95° C. under a pressure of 4.1 MPa. Under such conditions, to prevent explosion risks, a gaseous mixture fed to the reactor is diluted with chloropentafluoroethane.

The above disadvantages are avoided by the present invention over the above references which are hereby incorporated by reference.

DESCRIPTION OF THE INVENTION

Applicant has discovered that greater reaction speeds can be surprisingly obtained even if values of temperature and pressure are used, which are lower than those taught in the prior art, if the polymerization reaction in aqueous emulsion is carried out in the presence of tert.-butyl alcohol and 1,1,2,2-tetrachloro-1,2-difluoroethane $CCl_2F-CCl_2F$.

Applicant surprisingly found also that the molecular weight of the tetrafluoroethylene-ethylene copolymer can be regulated by varying the amount of tert.-butyl alcohol and of 1,1,2,2-tetrachloro-1,2-difluoroethane.

An object of the present invention is therefore to provide a process for preparing tetrafluoroethylene-ethylene copolymers which enables greater reaction speeds to be reached even if greater values of temperature and pressure are avoided.

Another object is providing a process for preparing the above copolymers using water as the main reaction medium, together with small amounts of organic solvents.

A further object is providing a process for preparing the above copolymers, which makes possible greater reaction speeds to be obtained even when low-molecular-weight copolymers are prepared.

These, and still further objects are achieved by the process according to the present invention for preparing copolymers of tetrafluoroethylene with ethylene and optionally with a third monomer, of vinylic character. This process is characterized in that tetrafluoroethylene is caused to react with ethylene and with the optional third monomer, of vinylic character, in an aqueous emulsion with the aid of a polymerization initiator of peroxy type, at a temperature within the range of from 30° to 95° C. and under a pressure within the range of from 1.5 to 4.0 MPa, in the presence of tert.-butyl alcohol and of 1,1,2,2-tetrachloro-1,2-difluoroethane (hereinafter "tetrachlorodifluoroethane").

The third monomer, of vinylic character, is generally selected from among those which are commonly used in tetrafluoroethylene-ethylene copolymers. It preferably is a fluorinated monomer, such as a fluoro-olefin, e.g., hexafluoropropene or perfluoroheptene-1, or is a perfluoroalkyl perfluorovinylether. Also non-fluorinated monomers, such as, e g., vinyl acetate or 2-methylpropene, can be used.

The amount of tert.-butyl alcohol is usually within the range of from 10 to 60 g per each kg of liquid reaction mixture (i.e., per each kg of mixture of water, tert.-butyl alcohol and tetrachlorodifluoroethane).

Such an amount is preferably within the range of from 10 to 35 g per each kg of liquid reaction mixture.

The amount of tetrachlorodifluoroethane is usually within the range of from 15 to 75 g per each kg of liquid reaction mixture, and is preferably within the range of from 20 to 70 g.

By operating with the above amounts of tert.-butyl alcohol and of tetrachlorodifluoroethane, reaction speeds are obtained, which are usually within the range of from 120 to 180 g of tetrafluoroethylene-ethylene copolymer per liter and per hour.

Applicant found also that lower molecular weights are obtained if the amount of tert.-butyl alcohol is increased, or if the amount of tetrachlorodifluoroethane is increased, or if the amounts of both of the compounds are increased. The use of only one of said compounds yields extremely great molecular weights, and a lower reaction speed.

Applicant found also that the addition of 1,1,2-trichloro-1,2,2,-trifluoroethane $CCl_2F-CClF_2$ (hereinafter "trichlorotrifluoroethane") to the polymerization system has an influence on the molecular weight of the obtained copolymer. More precisely, with other conditions being the same, the molecular weight increases with increasing amounts of trichlorofluoroethane. When this latter compound is used, the weight ratio of trichlorotrifluoroethane to tetrachlorodifluoroethane is usually within the range of from 0.2 to b 1.5.

The reaction is preferably carried out at a temperature within the range of from 65° to 80° C. When the reaction is carried out at temperatures lower than 65° C., a polymerization initiator of peroxy type is generally used, which is a redox system, e.g., an ammonium persulfate/silver nitrate system.

The reaction is carried out at a pressure preferably within the range of from 2.0 to 2.5 MPa. When a pressure greater than 2.5 MPa is used, the gaseous reaction mixture is generally diluted with a chlorofluorocarbon which is a gas at reaction temperature, e.g., with chloropentafluoroethane.

As the polymerization initiator, an inorganic peroxide, or an organic peroxide soluble in water or in tetrachlorodifluoroethane is used, which have a half-life time at the reaction temperature which is within the range of from 5 minutes to 500 minutes, and is preferably within the range of from 200 to 300 minutes.

Examples of suitable peroxides are trichloroacetyl peroxide, bis-(4-tert.-butyl-cyclohexyl)-peroxydicarbonate, peroxodisuccinic acid, ammonium persulfate and potassium persulfate.

The surfactants used are those which are conventionally used in the preparation of tetrafluoroethylene-ethylene copolymers in emulsion. For instance, ammonium perfluorooctanoate or potassium perfluoroalkylsulfonates, such as the products FC95 and FC98 by 3M, can be used.

The process according to the present invention is particularly suitable for preparing tetrafluoroethylene-ethylene copolymers containing 40-60 mole % of $C_2F_4$ and 40-60 mole % of $C_2H_4$, and for preparing terpolymers containing 40-60 mole % of $C_2F_4$, 40-60 mole % of $C_2H_4$, and 0.1-10 mole % of the third monomer, of vinylic character.

These copolymers, and the relevant terpolymers, are used in particular for coating electrical cables, in particular, in military and aerospace sectors, and in the chemical industry, as linings for equipment which operates under particularly severe conditions of temperature and/or chemical aggressivity.

The main advantages of the present invention can be summarized as follows:

fast reaction speeds are obtained also at relatively low values of temperature and pressure;

the main reaction medium is water, with a reduction in operating costs being thus obtained;

the molecular weight of the obtained copolymers can be easily regulated;

low-molecular-weight copolymers can be obtained, without the reaction speed being decreased.

EXAMPLES

The following examples are given for merely illustrative purposes and in no way should be construed as being limitative of the invention.

EXAMPLE 1

To an autoclave of 5 liters of capacity, 3.2 liters of deionized, oxygen-deprived water, 36 g of trichlorotrifluoroethane, 204 g of tetrachlorodifluoroethane, 120 g of tert.-butanol and 7.5 g of ammonium perfluorooctanoate are charged.

The temperature is increased up to 75° C. and 1.1 mole of tetrafluoroethylene is then charged. The pressure inside the reactor is increased up to 2.2 MPa with a mixture having the following composition, by weight:

| tetrafluoroethylene | 79.5% |
| --- | --- |
| ethylene | 20.5% |

The reaction is started by pumping a solution constituted by 1 g of ammonium persulfate and 100 ml of demineralized water into the autoclave. As soon as the pressure inside the reactor decreases by 0.2 MPa, the pressure of 2.2 MPa is restored with the above mixture, and is kept constant. Ninety-five minutes later, the feed is discontinued. The reactor is cooled and emptied. The obtained latex is coagulated by addition of 5 ml of hydrochloric acid. The polymer is washed many times with water and is dried at 150° C. The dry polymer obtained from this test has a weight of 950 g. Its melt-flow index at 297° C., measured according to ASTM D 3159-81a Standard, is 3.1 grams/10 minutes.

EXAMPLE 2

Example 1 was repeated with the difference that no trichlorotrifluoroethane was added, and 240 g of tetrachlorodifluoroethane was added. The reaction proceeded for 103 minutes. The dry polymer obtained from this test weighed 1020 g. Its melt-flow index at 297° C. was 8.9 grams/10 minutes.

EXAMPLE 3

An autoclave of 5 liters of capacity is charged with 3.2 liters of deionized, oxygen-deprived water, 36 g of trichlorotrifluoroethane, 204 g of tetrachlorodifluoroethane, 40 g of tert.-butanol and 7.5 g of ammonium perfluorooctanoate.

The temperature is increased up to 75° C. and 1.1 mole of tetrafluoroethylene and 0.13 mole of trifluoromethyltrifluorovinylether are then charged. The pressure inside the reactor is increased up to 2.2 MPa with a mixture having the following composition, by weight:

| tetrafluoroethylene | 75.6% |
| --- | --- |
| ethylene | 19.5% |
| trifluoromethyl-trifluorovinylether | 4.9% |

The reaction is started by pumping a solution constituted by 1 g of ammonium persulfate and 100 ml of demineralized water into the autoclave. As soon as the pressure inside the reactor decreases by 0.2 MPa, the pressure of 2.2 MPa is restored with the above mixture, and is kept constant. One hundred and four minutes later, the feed is discontinued. The reactor is cooled and emptied. The obtained latex is coagulated by the addition of 5 ml of hydrochloric acid. The polymer is washed many times with water and is dried at 150° C. The dry polymer obtained from this test has a weight of 1070 g. Its melt-flow index at 297° C. is 1.8 grams/10 minutes.

EXAMPLE 4

Example 3 was repeated with the difference that instead of 40 g of tert.-butanol, 80 g of tert.-butanol was added. The reaction proceeded for 100 minutes. The dry polymer obtained from this test weighed 1090 g. Its melt-flow index at 297° C. was 3.4 grams/10 minutes.

EXAMPLE 5

Example 3 was repeated with the difference that instead of 40 g of tert.-butanol, 120 g of tert.-butanol was added. The reaction proceeded for 96 minutes. The dry polymer obtained from this test weighed 1020 g. Its melt-flow index at 297° C. was 5.9 grams/10 minutes.

EXAMPLE 6 (COMPARATIVE EXAMPLE)

Example 3 was repeated with the difference that no tert.-butanol was added. The reaction proceeded for 124 minutes. The dry polymer obtained from this test weighed 995 g. Its melt-flow index at 297° C. was 0.2 grams/10 minutes.

EXAMPLE 7 (COMPARATIVE EXAMPLE)

Example 3 was repeated with the difference that 240 g of trichlorotrifluoroethane and 120 g of tert.-butanol were added, in the absence of tetrachlorodifluoroethane. The reaction proceeded for 98 minutes. The dried polymer obtained from this test weighed 960 g. Its melt-flow index at 297° C. was 0.1 grams/10 minutes.

EXAMPLE 8 (COMPARATIVE EXAMPLE)

Example 3 was repeated with the difference that no tert.-butanol was added, and 4 ml of carbon tetrachloride was added, to act as the molecular weight regulator. The reaction proceeded for 190 minutes. The dry polymer obtained from this test weighed 980 g. Its melt-flow index at 297° C. was 6.2 grams/10 minutes.

The use of carbon tetrachloride requires a reaction time of 190 minutes compared to the time of 104 minutes required by tertiary butanol.

EXAMPLE 9 (COMPARATIVE EXAMPLE)

Example 3 was repeated with the difference that the mixture of chlorofluorocarbon solvents was not added. The reaction proceeded for 280 minutes. The dry polymer obtained from this test weighed 1010 g. Its melt-flow index at 297° C. was 0.3 grams/10 minutes.

EXAMPLE 10

Example 3 was repeated with the difference that trichlorotrifluoroethane was not added, and 120 g of tertiary butanol and 240 g of tetrachlorodifluoroethane were added. The reaction proceeded for 104 minutes. The dry polymer obtained from this test weighed 990 g. Its melt-flow index at 297° C. was 11.4 grams/10 minutes.

EXAMPLE 11

Example 3 was repeated with the difference that trichlorotrifluoroethane was not added, and 80 g of tertiary butanol and 240 g of tetrachlorodifluoroethane were added. The reaction proceeded for 111 minutes. The dry polymer obtained from this test weighed 970 g. Its melt-flow index at 297° C. was 7.6 grams/10 minutes.

EXAMPLE 12

Example 3 was repeated with the difference that trichlorotrifluoroethane was not added, and 84 g of tertiary butanol and 168 g of tetrachlorodifluoroethane were added. The reaction proceeded for 122 minutes. The dry polymer obtained from this test weighed 975 g. Its melt-flow index at 297° C. was 6.5 grams/10 minutes.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A process for preparing copolymers of tetrafluoroethylene with ethylene and possibly with a third monomer, of vinylic character, comprising reacting tetrafluoroethylene with ethylene in an aqueous emulsion with the aid of a peroxy polymerization initiator at a temperature within the range of from 30° to 95° C. and under a pressure within the range of from 1.5 to 4.0 MPa, in the presence of tert.-butyl alcohol and of 1,1,2,2-tetrachloro-1,2-difluoroethane.

2. The process according to claim 1, wherein the reaction of tetrafluoroethylene with ethylene further includes a third monomer of vinylic character.

3. The process according to claim 2, wherein the third vinyl monomer is a fluorinated vinyl monomer.

4. The process according to claim 1, wherein the amount of tert.-butyl alcohol is within the range of from 10 to 60 g per each kg of liquid reaction mixture.

5. The process according to claim 4, wherein the amount of tert.-butyl alcohol is within the range of from 10 to 35 g per each kg of liquid reaction mixture.

6. The process according to claim 1, wherein the amount of 1,1,2,2-tetrachloro-1,2-difluoroethane is within the range of from 15 to 75 g per each kg of liquid reaction mixture.

7. The process according to claim 6, wherein the amount of 1,1,2,2-tetrachloro-1,2-difluoroethane is within the range of from 20 to 70 g per each kg of liquid reaction mixture.

8. The process according to claim 1 wherein the reaction medium also contains 1,1,2-trichloro-1,2,2-trifluoroethane.

9. The process according to claim 8, wherein the weight ratio of 1,1,2-trichloro-1,2,2-trifluoroethane to 1,1,2,2-tetrachloro-1,2-difluoroethane is within the range of from 0.2 to 1.5.

10. The process according to claim 1, wherein the reaction is carried out at a temperature within the range of from 65° to 80° C.

11. The process according to claim 1, wherein the reaction is carried out at a pressure within the range of from 2.0 to 2.5 MPa.

12. The process according to claim 2, wherein the copolymer of tetrafluoroethylene with ethylene and with a third vinyl monomer contains from 40 to 60 mole % of tetrafluoroethylene and from 40 to 60 mole % of ethylene, and from 0 to 10 mole % of the third vinyl monomer.

13. Copolymers comprising tetrafluoroethylene with ethylene obtained according to the process of claims 1 or 2.

* * * * *